(12) United States Patent
Oberheide et al.

(10) Patent No.: US 12,478,056 B2
(45) Date of Patent: Nov. 25, 2025

(54) AGRICULTURAL MACHINE HAVING IMPROVED SUSPENSION

(71) Applicant: Amazon-Werke H. Dreyer SE & Co. KG, Hasbergen (DE)

(72) Inventors: Friedrich Oberheide, Bissendorf (DE); Anna-Gret Borchert, Osnabrück (DE); Frank Grosse Prues, Bersenbrük (DE); Stefan Austermann, Telgte (DE)

(73) Assignee: Amazon-Werke H. Dreyer GmbH & Co. KG, Hasbergen (DE)

( * ) Notice: Subject to any disclaimer, the term of this patent is extended or adjusted under 35 U.S.C. 154(b) by 824 days.

(21) Appl. No.: 17/639,171

(22) PCT Filed: Aug. 6, 2020

(86) PCT No.: PCT/EP2020/072145
§ 371 (c)(1),
(2) Date: Feb. 28, 2022

(87) PCT Pub. No.: WO2021/037519
PCT Pub. Date: Mar. 4, 2021

(65) Prior Publication Data
US 2022/0264859 A1    Aug. 25, 2022

(30) Foreign Application Priority Data
Aug. 29, 2019  (DE) .................... 10 2019 123 175.2

(51) Int. Cl.
*A01M 5/00* (2006.01)
*A01M 7/00* (2006.01)

(52) U.S. Cl.
CPC ........ *A01M 7/0075* (2013.01); *A01M 7/0089* (2013.01); *A01M 7/0057* (2013.01)

(58) Field of Classification Search
CPC . A01M 7/0075; A01M 7/0089; A01M 7/0057
See application file for complete search history.

(56) References Cited

U.S. PATENT DOCUMENTS

| | | | | |
|---|---|---|---|---|
| 5,507,435 A | * | 4/1996 | Benest | A01M 7/0057 239/167 |
| 5,957,383 A | * | 9/1999 | Benest | A01B 73/04 239/168 |

(Continued)

FOREIGN PATENT DOCUMENTS

| | | |
|---|---|---|
| EP | 2311318 A1 | 4/2011 |
| EP | 2829177 A1 | 1/2015 |
| EP | 3058820 A1 | 8/2016 |

OTHER PUBLICATIONS

International Search Report issued on Nov. 16, 2020, in corresponding PT Application No. PCT/EP2020/072145.

*Primary Examiner* — Eret C McNichols
(74) *Attorney, Agent, or Firm* — Mintz Levin Cohn Ferris Glovsky and Popeo, P.C.

(57) ABSTRACT

The invention relates to an agricultural apparatus (1) for spreading material such as fertilizer, plant protection products or seed, comprising a distributor linkage (10) which can be folded on both sides, comprising a central part (11), where the central part (11) is connected in a rotationally fixed manner to the agricultural apparatus (2), two intermediate frames (12a,b) connected to the central part (11), in particular by joints, two lateral booms (13a,b) connected to the respective intermediate frames (12a,b), a first hydraulic actuating device (14) which connects a first of the intermediate frames (12a) to the central part (11), where the respective first boom (13a) can be moved by way of the first hydraulic actuating device (14) about a first axis of rotation (h1) pointing in the direction of travel of the agricultural apparatus (1), and a second hydraulic actuating device (15), (Continued)

Figure 2:
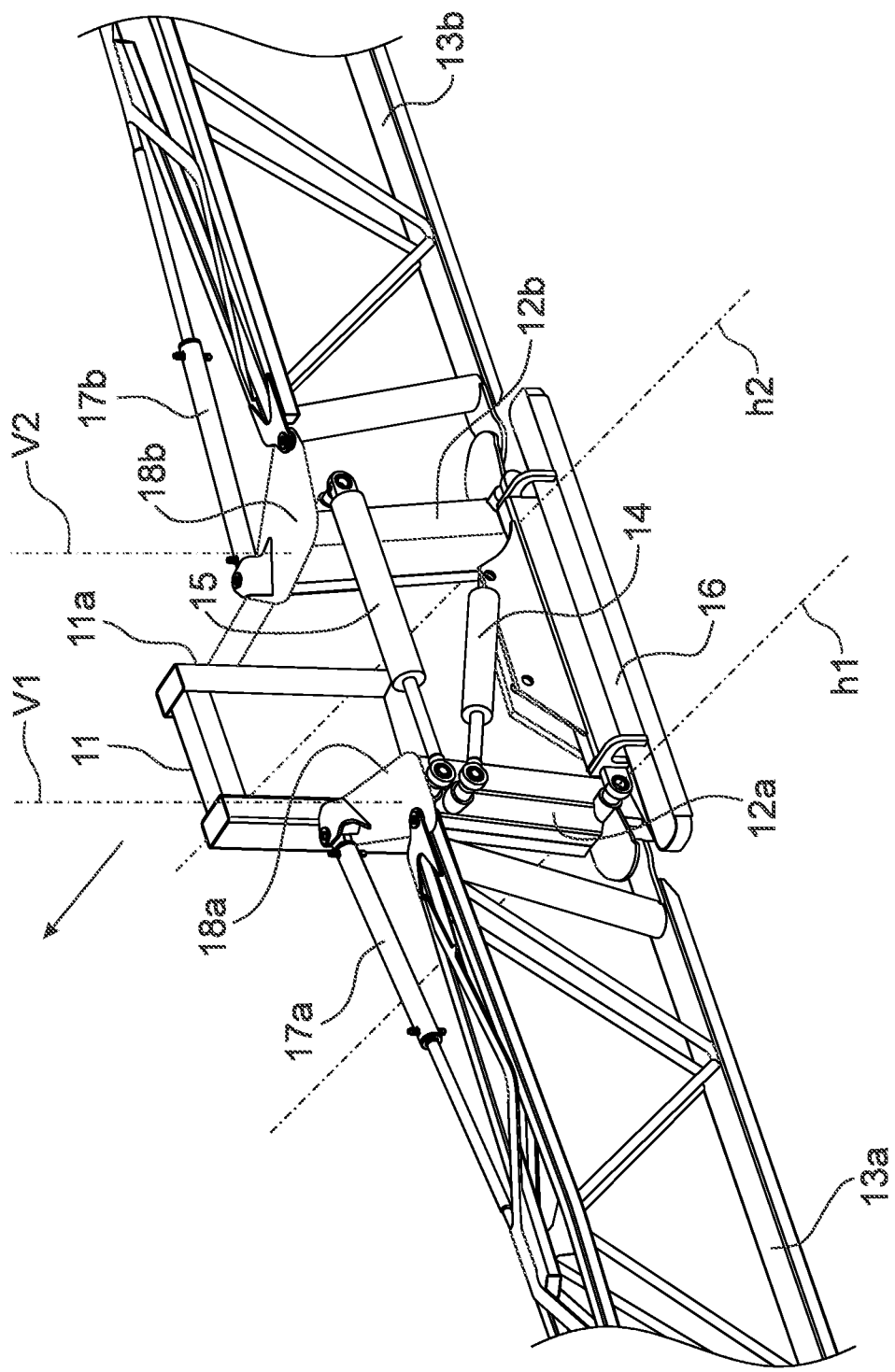

where the respective second arm (13b) can be moved by way of the second hydraulic actuating device (15) about a second axis of rotation (h2) pointing in the direction of travel of the agricultural apparatus (1).

13 Claims, 11 Drawing Sheets

(56) References Cited

U.S. PATENT DOCUMENTS

| | | | | |
|---|---|---|---|---|
| 6,053,419 | A * | 4/2000 | Krohn | A01M 7/0057 52/114 |
| 6,119,963 | A * | 9/2000 | Bastin | A01M 7/0075 239/168 |
| 6,343,661 | B1 * | 2/2002 | Thompson | A01M 7/0053 172/444 |
| 6,402,051 | B1 * | 6/2002 | Humpal | A01B 73/02 239/165 |
| 6,966,501 | B2 * | 11/2005 | Wubben | A01M 7/0071 52/646 |
| 7,152,811 | B2 * | 12/2006 | Gunlogson | A01M 7/0053 239/161 |
| 7,740,189 | B2 * | 6/2010 | Meyer | A01M 7/0053 239/172 |
| 7,913,930 | B2 * | 3/2011 | Theeuwen | A01C 23/008 239/164 |
| 8,464,967 | B2 * | 6/2013 | Kuphal | B05B 1/20 239/161 |
| 8,827,180 | B2 * | 9/2014 | Honermann | A01M 7/0071 239/161 |
| 9,021,968 | B2 * | 5/2015 | Blunier | A01C 23/008 111/121 |
| 9,504,211 | B2 * | 11/2016 | Venton-Walters | F16F 7/104 |
| 9,737,067 | B2 * | 8/2017 | Desai | A01B 69/008 |
| 10,188,092 | B2 * | 1/2019 | Pilney | A01M 7/0078 |
| 11,234,432 | B2 * | 2/2022 | Bartlett | A01M 7/0078 |
| 12,129,903 | B2 * | 10/2024 | Oberheide | A01C 23/008 |
| 2009/0173802 | A1 * | 7/2009 | Theeuwen | A01M 7/0053 239/164 |
| 2011/0017849 | A1 * | 1/2011 | Trennenpohl | A01C 23/008 239/723 |
| 2014/0015212 | A1 * | 1/2014 | Ballu | A01M 7/0053 280/124.111 |
| 2014/0150416 | A1 * | 6/2014 | Lee | E02F 9/2207 92/143 |
| 2021/0195886 | A1 * | 7/2021 | Smith | A01M 7/0053 |

* cited by examiner

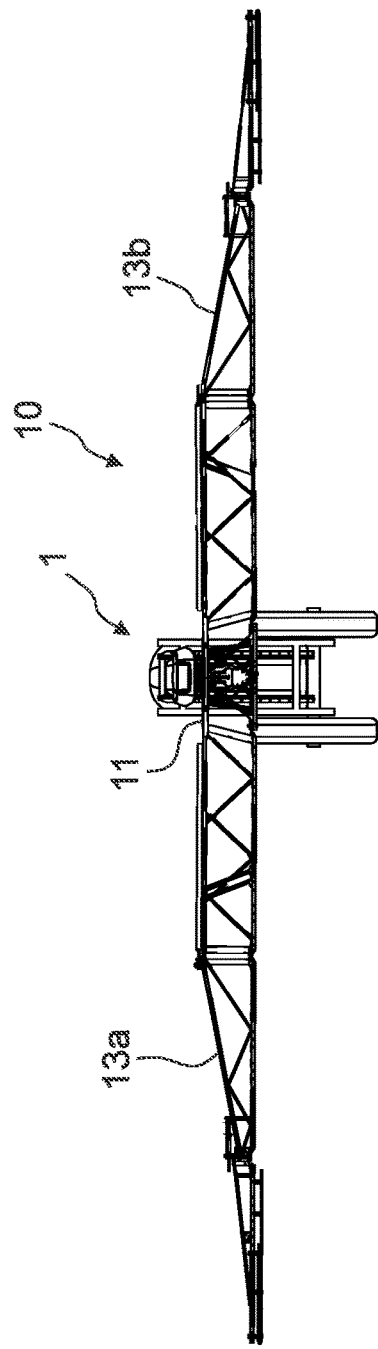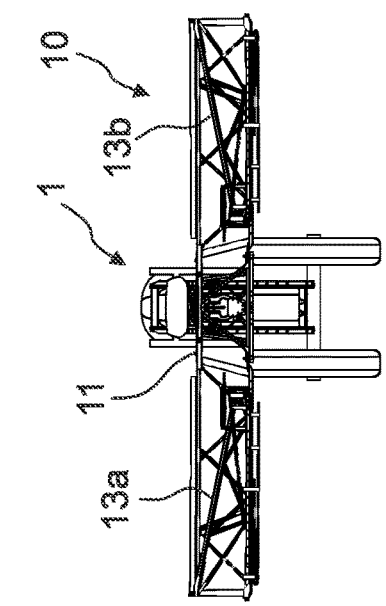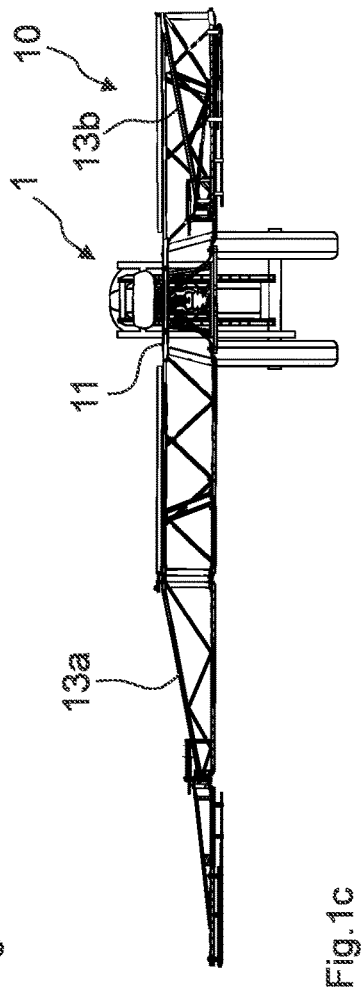

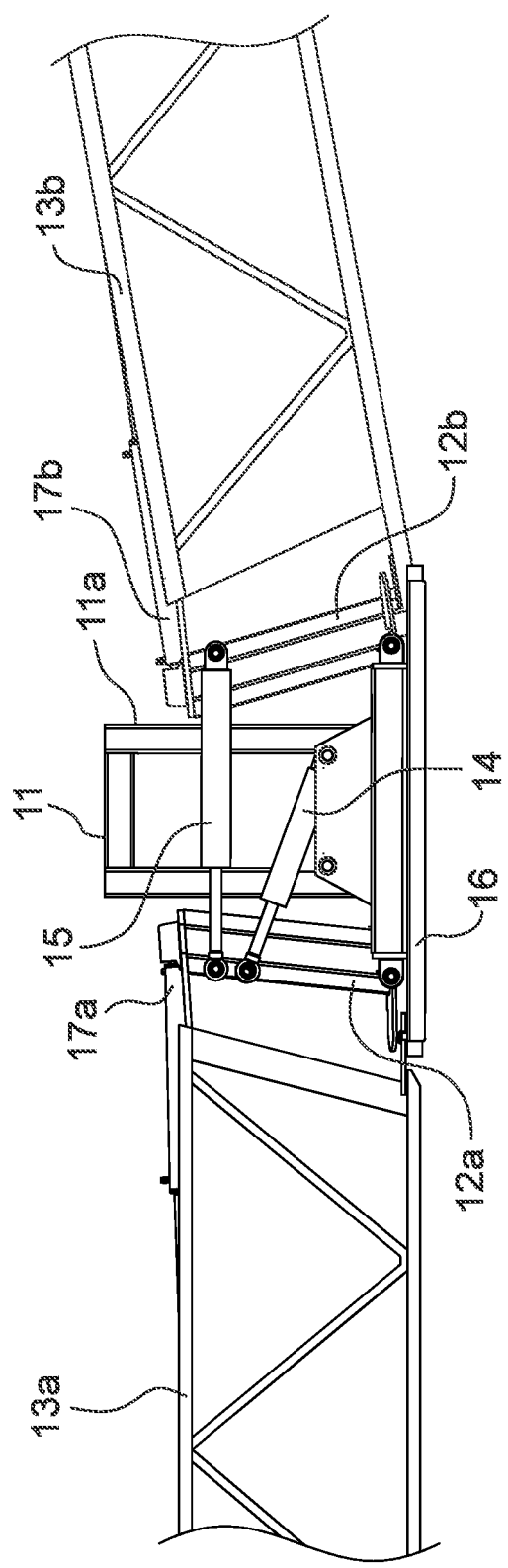

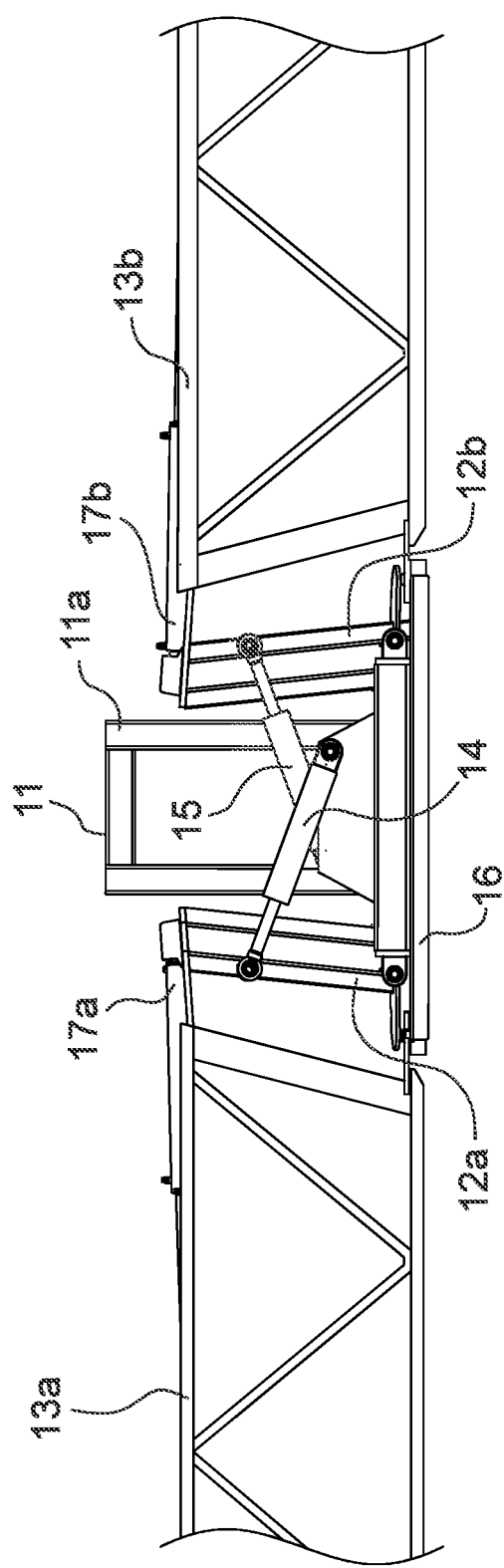

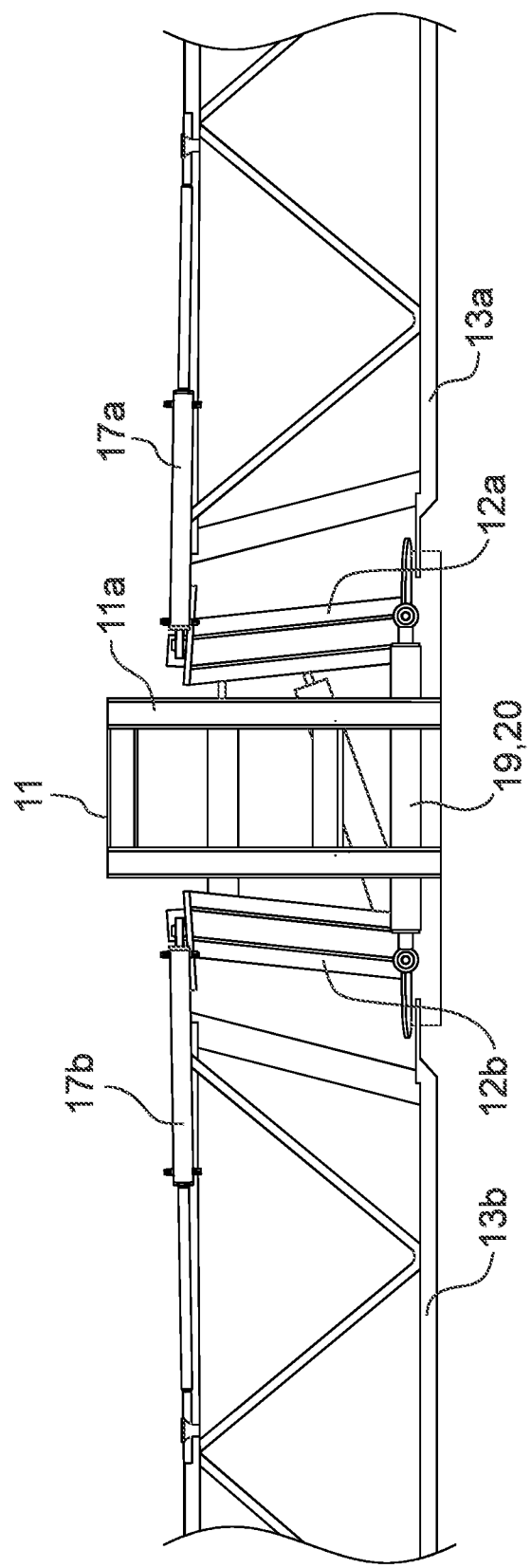

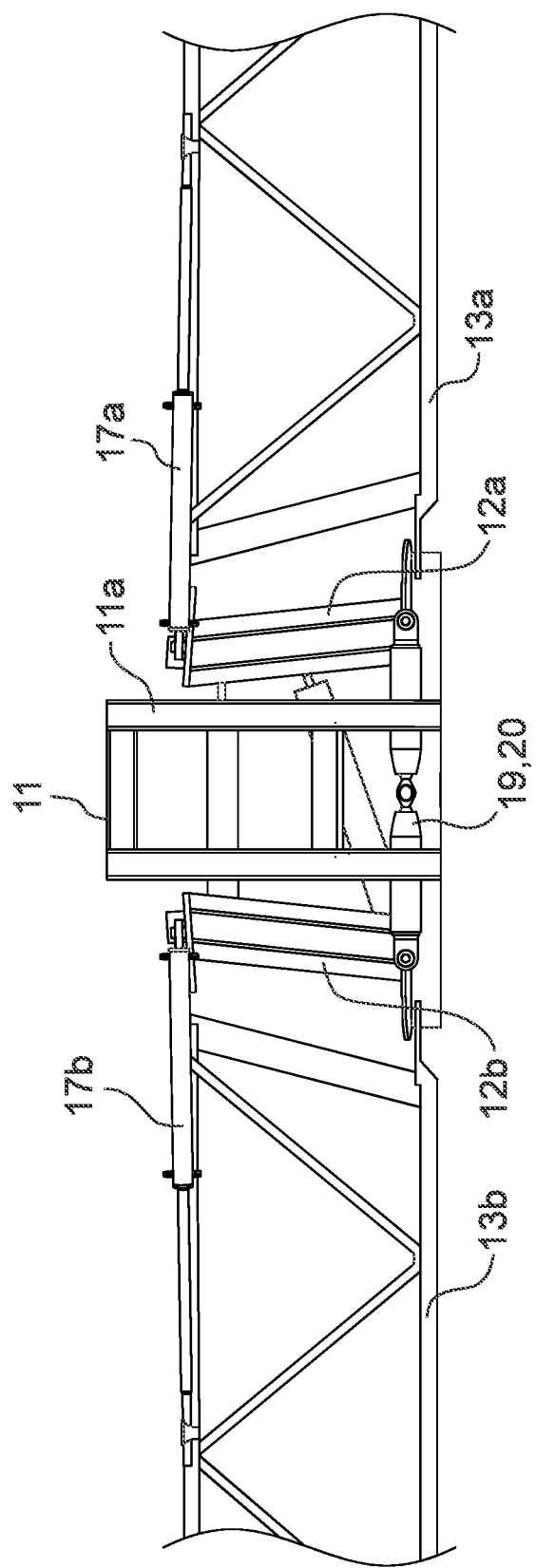

AGRICULTURAL MACHINE HAVING IMPROVED SUSPENSION

CROSS-REFERENCES TO RELATED APPLICATIONS

This application is a US National Stage of International Application No. PCT/EP2020/072145, filed on Aug. 6, 2020, entitled "Agricultural Machine Having Improved Suspension." International Application No. PCT/EP2020/072145 claims the benefit of DE 10 2019 123 175.2, filed on Aug. 29, 2019. The entirety of each these applications is incorporated herein by reference.

The invention relates to an agricultural apparatus The invention furthermore relates to a method for controlling and/or regulating an agricultural apparatus.

A variety of agricultural apparatuses for spreading material, such as fertilizer, plant protection products, or seed are known, for example, field sprayers. In order to spread the material over a large area and efficiently on the ground of the field to be worked, the agricultural apparatus comprises a distributor linkage with several spreading elements, such as spray nozzles. The distributor linkage extends transverse to the direction of travel and can have working widths of up to 50 m. During operation, the distance between the distributor linkage and the ground should remain as constant as possible over the entire working width of the distributor linkage. This means that the distributor linkage is kept as parallel as possible to the ground to be worked, even if the ground to be worked is uneven.

It is problematic to have the agricultural vehicle drive in ruts of different depths in the ground, in a furrow on one side, or on a slope of the field to be worked. If the ground is uneven in this way, the ends of the distributor linkage can come into contact with the ground and/or crops and be damaged. In addition, the homogeneous distribution of the material to be spread is no longer given due to the inclined position of the distributor linkage relative to the ground and therefore a larger or smaller distance between the ground and individual nozzles.

In order to compensate for this inclination and undesired motions about the longitudinal axis of the vehicle, devices are known which have a pendulum suspension and inclination sensors or distance sensors and which attempt to adjust the constant distance to the ground using actuating devices.

The inclination of the booms of the distributor linkage is often adjusted by hydraulic cylinders and spring damper systems that are connected to the respective boom. Reference is made by way of example to FR 2 795 913 A1 EP 1 167 095 A1 and EP 0 922 385 A1, The distance between the boom and the ground and/or the relative angle between the boom and the tractor are used as measurement variables in the known control measures. The known control measures have the drawbacks that they are imprecise and do not allow for real-time adjustment.

In contrast, the field sprayer, for example, according to EP 1 444 894 A1 comprises a multi-link suspension in which the signals from the distance measurement between the boom and the ground as well as the inclination signals, which reflect the relative inclination between the vehicle and the boom, are included in the control measure. The boom is mounted to be rotatable on a height-adjustable lifting frame about an axis of rotation pointing in the direction of travel. A rotatable intermediate frame is attached to the lifting frame coaxially with the boom. The intermediate frame and the boom are coupled to one another by two centering springs and a damper. A hydraulic cylinder is provided between the intermediate frame and the lifting frame.

To adjust the inclination, the hydraulic cylinder is extended or retracted and rotates the intermediate frame relative to the lifting frame. This lengthens one of the two centering springs and shortens the other. The spring force acting upon the boom pulls the boom along according to the motion of the intermediate frame so that it is again centered in relation to the intermediate frame in the inclined final position. The centering springs also compensate for rapid relative motions between the vehicle and the boom so that the boom remains stable in position during operation.

Firstly, the signals from the ground clearance measurement between the boom and the ground and, secondly, an inclination signal which forms a measure of the spring force acting upon the boom enter the inclination control. This allows the hydraulic cylinder to be actuated precisely. The boom oversteering is largely prevented.

However, this inclination control is slow. In addition, the structure with the intermediate frame and the springs connected between the intermediate frames and the boom is complex.

The object of the present invention is therefore to provide an agricultural apparatus with improved inclination control. The further object of the present invention is to provide a method for controlling an agricultural apparatus.

These objects are satisfied by an agricultural apparatus according to claim 1 and a method according to claim 13. Preferred embodiments are described in the dependent claims.

The agricultural apparatus can be, in particular, a field sprayer. The field sprayer can be self-propelled. It can also be a trailed, carried, attached, or mounted sprayer.

Unless explicitly stated otherwise, the terms "horizontal axis/direction" and "vertical axis/direction" hereinafter each refer to an axis/direction that points in the direction of travel of the agricultural apparatus or, respectively, an axis/direction that is perpendicular to the direction of travel of the agricultural apparatus and is perpendicular to the ground.

Furthermore, angling a boom up and down is hereinafter to be understood to be a rotational motion of the boom about a horizontal axis of rotation, in particular the horizontal axis of rotation of the respective intermediate frame. In other words, angling up and down causes a change in the angle of the respective boom relative to the horizontal. The respective boom then moves away from the ground when angling up and towards the ground when angling down. Tilting the distributor linkage accordingly denotes one boom being angled up while the other boom accordingly being angled down. The motion of one or both booms about the respective horizontal axis of rotation is also referred to hereafter as an inclination motion, and the corresponding position is also referred to as inclination.

According to the invention, the distributor linkage of the agricultural apparatus comprises a central part which is attached in a rotationally fixed manner to the agricultural apparatus and two intermediate frames which are connected to the central part by way of joints. In particular, the connection of the intermediate frames to the central part is configured such that the intermediate frames can are moveable about at least one horizontal axis of rotation. Furthermore, the intermediate frames are each movable about a vertical axis of rotation.

The lateral booms of the distributor linkage are each connected to one of the two intermediate frames. In particular, the connection of the booms to the intermediate frame is configured such that a motion of the intermediate frame, in particular a rotational motion about a horizontal axis, is transmitted to the respective boom.

According to the invention, two hydraulic actuating devices are furthermore provided, where a first hydraulic actuating device connects the central part to a first of the two intermediate frames so that the corresponding first boom can be moved by way of the first hydraulic actuating device about a first horizontal axis. The second boom can be moved by way of a second hydraulic actuating device about a second horizontal axis.

Improved and simplified inclination control of the respective booms can be achieved due to the fact that the two booms are attached separately in a rotatable manner to the rotationally-fixed central part by way of the respective intermediate frames, where the two hydraulic actuating devices are provided for adjusting the inclination of the intermediate frames. Changes in inclination at the distributor linkage can thus be achieved for the agricultural apparatus according to the invention by directly controlling the booms, unlike the known agricultural apparatuses described above.

The central part can comprise a transverse frame in its lower region. The first and the second intermediate frames can be arranged pointing upwardly on the transverse frame, The first and the second horizontal axis of rotation can be arranged in the lower region of the first and the second intermediate frame. In other words, with this arrangement, the respective horizontal axes of rotation can be disposed in the vertical direction close to the spray nozzles of the linkage. In order to cover the entire working width of the agricultural apparatus, spray nozzles are provided both on the respective booms as well as on the central part. Since angling a boom up creates a gap between the boom and the central part, the distance between the spray nozzles arranged on the respective boom and the spray nozzles provided on the central part increases. This results in a region of the ground travelled over which cannot be covered, or only insufficiently, by the spray nozzles. By arranging the horizontal axis of rotation in the lower region of the distributor linkage, it is achieved that this gap be kept as small as possible.

The first hydraulic actuating device can be connected to the first intermediate frame in the upper region of the first intermediate frame and to the central part in the lower region of the intermediate frame, in particular to the transverse frame and spaced from the first intermediate frame. In other words, the first hydraulic actuating device can be arranged in the vertical direction at an angle between the first intermediate frame and the central part. It can be achieved with such an arrangement that the two points of action of the first actuating device are each at the greatest possible distance from the first axis of rotation. Advantageous transmission of force from the first actuating device to the first intermediate frame can be achieved in this way.

The first and the second actuating device can be configured as a hydraulic cylinder, in particular as a double-action hydraulic cylinder. Such cylinders provide an inexpensive and simple option of controlling the position of the distributor linkage. The double-action hydraulic cylinders can each be configured, for example, with a piston that can be pressurized on both sides.

One or more pressure sensors can also be associated with the hydraulic devices. Motions of a boom and the associated intermediate frame can transfer corresponding forces to the respective hydraulic actuating device, which in turn can reflect changes in pressure in the hydraulic actuating device. These changes in pressure can be detected by way of the pressure sensors mentioned. Furthermore, a pressure prevailing at the hydraulic actuating device can also correspond to an inclined position of a boom. In this case, the inclination of a respective boom can also be monitored with the pressure sensors.

The pressure sensors can be embodied as pressure sensors for direct pressure measurement, in particular as pressure transducers. Such a configuration has the advantage that it allows both a relative pressure and an absolute pressure to be determined. Furthermore, the pressure sensors can preferably be formed as differential pressure transducers for determining a differential pressure or a pressure difference arising, respectively. Advantageously, the pressure transducers can detect the pressure to be measured by way of a measuring membrane which is mechanically deformed as a function of the respective pressure. This mechanical change can be measured electronically, be output as an analog or digital output signal, and transmitted, for example, to the control unit.

Respective hydraulic valves, in particular directional control valve, can be associated with the first and the second hydraulic actuating devices, In conjunction with pressure sensors, the hydraulic valves can be configured as pressure regulating valves for maintaining a pressure on the consumer side as a function of an electrical control signal, in particular a control current.

The hydraulic valve can be, for example, a directly controlled and spring-loaded three-way valve, for example, having a slide design. In the de-energized state or without a control signal, respectively, the pressure at the consumer is relieved toward a hydraulic tank. With a maximum control signal, the maximum possible pressure (either the pressure supply or the maximum value of the hydraulic valve) is regulated in a manner adjusted to the consumer.

When a control signal is applied, the spring load in the valve is counteracted electromagnetically and the pressure on the consumer side is thereby maintained according to the control characteristic of the valve. For example, the pressure set is then proportional to the control signal which is in particular a control current. However, such a proportional control characteristic is not absolutely necessary and can be replaced, for example, by non-proportional activation for cost reasons. For this purpose, any desired control characteristics can be stored in the regulating unit for calculating and outputting control signals that match individual setpoint pressure values.

The valves can comprise in particular a valve body with a control piston, a return spring, and a magnet coil with an armature for electrical activation. When an electrical signal is applied via the regulating unit, the armature can press on the control piston with a force that corresponds to the signal. This allows oil to flow through the valve and pressure to be built up or released, whereby the actuating device can be activated. This continues until the pressure applied corresponds to the setpoint pressure according to the electrical signal.

In general, the mode of operation of proportional pressure control valves is based on the regulation of a pressure difference that arises. If the pressure falls below a preset level, the valve automatically supplies oil from the hydraulic reservoir until the setpoint has been reached again. Otherwise, if the pressure level is too high, oil is drained. The use of proportional pressure regulating valves provides efficient control and stability characteristics, as well as a small hysteresis of the valves, which can arise due to friction and magnetization. Furthermore, proportional valves enable space-saving installation as well as simple assembly and replacement.

The hydraulic valves can be set to a setpoint value in an electronically controlled manner using a known characteristic curve. The characteristic curves describe, for example, the relationship between a pressure arising and the associated electrical current required at a control coil of the valve. For example, a setpoint value to be set for the hydraulic valves can be determined by way of the pressure sensors described above, as a result of which a control current is applied to the valves on the basis of the characteristic curve in order to set the corresponding pressure. This has the advantage that the pressure at the distributor linkage can be adjusted precisely to a setpoint value using the characteristic curve of the hydraulic valves.

Furthermore, a check valve associated with the respective hydraulic valve can be associated with the first actuating device and the second actuating device. In particular, the outflow of hydraulic fluid from the respective actuating device can be prevented with such a check valve. The respective booms can be locked therewith in a desired position. This can be desirable, for example, in situations such as road transport, or when folding the distributor linkage in and out, in which the distributor linkage is to be rigidly connected to the agricultural apparatus by way of the actuating device.

The hydraulic actuating devices can furthermore be connected to a hydraulic circuit via the hydraulic valves. The hydraulic circuit can be an open circuit comprising, for example, a pump and a hydraulic tank.

The respective booms can be configured to be multi-part. They can comprise foldable segments that can be moved about an axis running perpendicular to the direction of travel. The booms can still be folded in and out in segments. They can also assume intermediate positions. This makes it possible to adjust the working width of the agricultural apparatus in that a certain number of segments are folded out. In particular, this can be done for one boom independently of the other boom. Sensors, in particular potentiometers, can be attached to the joints disposed between the foldable segments for determining the folding states. These sensors can detect segments that are fully folded in/folded out as well as intermediate positions at the joints between adjacent segments and transmit the respective folding status to the control unit. In addition, it is possible by way of the segmentation described to fold the boom in in a compact manner, for example, to a transport position.

The second hydraulic actuating device can connect the intermediate frames to one another, in particular in the upper region of the intermediate frames. In this embodiment, the inclination control of the respective booms can be achieved by an interaction of the two hydraulic actuating devices. For example, the extension or retraction of the piston of the first actuating device can cause the first boom to angle down or up. Since the two intermediate frames are coupled by way of the second actuating device in this embodiment, the resulting motion of the first intermediate frame can be transmitted to the second intermediate frame. Depending on the desired position of the second boom, the piston of the second actuating device can also be extended or retracted.

If, for example, only the first boom is to be angled up, then the piston of the first actuating device can be retracted in this embodiment. In order to prevent the resulting motion of the first intermediate frame from being transmitted to the second intermediate frame, the piston of the second actuating device can likewise be retracted. This can be done, for example, by actively controlling the second actuating device.

If, for example, only the second boom is to be angled up, then the piston of the second actuating device can be retracted in this embodiment. The piston position of the first actuating device, however, can be maintained. This can be done, for example, by actively controlling the first actuating device, but also by locking the first actuating device, for example, by way of a check valve. In this case, the first intermediate frame is therefore affixed by way of the first actuating device.

For example, if the entire distributor linkage is to be tilted, the piston of the first actuating device in this embodiment can be retracted or extended depending on the desired direction of inclination. The piston position of the second actuating device, however, can be maintained. This can be done, for example, by actively controlling the second actuating device, but also by locking the second actuating device, for example, by way of a check valve. As a result, the motion of the first intermediate frame can be transmitted to the second intermediate frame, and both booms can move in the same direction about their respective axes of rotation. This leads to one of the booms angling up and to the other boom respectively angling down, and therefore to the linkage tilting.

This embodiment therefore allows for flexible and simple control of the inclination of the entire distributor linkage. It goes without saying that any inclination position of the booms is possible by appropriate control of the respective actuating devices.

Alternatively, the second hydraulic actuating device can connect the second of the intermediate frames to the central part. In this embodiment, the inclination control of the first and the second boom can be performed independently. The first actuating device can there be responsible for the inclination control of the first boom, and the second actuating device can be responsible for the inclination control of the second boom. For example, the extension or retraction of the piston of the first actuating device can cause the first boom to angle down or up. Similarly, the extension or retraction of the piston of the second actuating device can cause the second boom to angle down or up. In particular, the hydraulic actuating devices can be arranged such that a motion of the first intermediate frame does not affect the second intermediate frame, and vice versa.

For example, in order to angle the first boom up or down, the piston of the first actuating device can be retracted or extended in this embodiment. The second actuating device and the second intermediate frame can there remain unchanged. The position of the second boom then also does not change. Similar thereto, the piston of the second actuating device can be retracted or extended for angling the second boom up or down. The first actuating device and the first intermediate frame can there remain unchanged. The position of the first boom then also does not change.

This embodiment therefore allows for simple individual inclination control of the two booms. In this embodiment, tilting the entire distributor linkage can be achieved by individually angling one boom up and simultaneously individually angling the other boom down, It goes without saying that any inclination position of the booms is possible by appropriate individual control of the respective actuating devices.

The second hydraulic actuating device in this embodiment can be connected to the second intermediate frame in the upper region of the second intermediate frame and to the central part in the lower region, in particular to the transverse frame and spaced from the second intermediate frame. In other words, the second hydraulic actuating device can be arranged at an angle in the vertical direction between the second intermediate frame and the central part. It can be achieved with such an arrangement that the two points of action of the second actuating device are each at the greatest possible distance from the second axis of rotation. Advantageous transmission of forces from the second actuating device to the second intermediate frame can be achieved in this way.

The intermediate frames can each be connected to the central part by way of a ball joint. Such a connection allows for the intermediate frames to be moved about both a horizontal as well as a vertical axis in a simple manner.

The agricultural apparatus can further comprise a third hydraulic actuating device, where the third hydraulic actuating device connects a first of the booms to the respective first intermediate frame, where it is possible for the first boom to be moved by way of the third hydraulic actuating device about a first vertical axis of rotation. In addition, the agricultural apparatus can comprise a fourth hydraulic actuating device, where the fourth hydraulic actuating device connects the second of the booms to the respective second intermediate frame, where it is possible for the second boom to be moved by way of the fourth hydraulic actuating device about a second vertical axis of rotation.

The third and the fourth hydraulic actuating devices can be particularly suitable to transfer the booms of the distributor linkage from a transport position to a working position and vice versa. In the case of field sprayers such as those described at the outset, such actuating devices, also referred to as folding cylinders, typically connect the respective booms directly to a central part of the linkage. This has the disadvantage that, when a boom inclination is controlled in relation to the central part, the folding cylinders always have to be controlled as well. This can advantageously be avoided by the connection described of the folding cylinders to the intermediate frame and the boom.

Furthermore, the agricultural apparatus can comprise a damping assembly for damping motions of the first boom and the second boom, in particular in the direction of travel of the agricultural apparatus. By damping such motions, which can arise, for example, due to the inertia of the booms when the agricultural apparatus is cornering, the forces that are transmitted to the central part are reduced. On the other hand, the damping device also suppresses the transmission of motions from the agricultural apparatus to the respective boom. In other words, the damping device contributes to decoupling the motions of the respective booms, on the one hand, and of the agricultural apparatus, on the other hand.

The damping assembly can connect the intermediate frames to one another independently of the central part. This means in particular that the damping assembly is configured to transmit a rotational motion of a boom about a vertical axis to the other boom in a damped manner, In this way it can be avoided that torques, which originate, for example, from vibrations of the distributor linkage in or opposite to the direction of travel, are transmitted to the central part and thereby to the agricultural apparatus. At the same time, damping such vibrations of the distributor linkage can be achieved.

Alternatively, the damping assembly can connect the respective intermediate frames to the central part. This can be realized, for example, by two individual damping elements, each of which connects an intermediate frame to the central part. Such an embodiment can be particularly advantageous for active damping regulation since the respective booms can be specifically influenced there. The transmission of forces from the respective boom to the central part can be largely suppressed in this embodiment with suitable active damping regulation.

The damping assembly can comprise at least one mechanical and/or hydraulic damping element, in particular a hydraulic cylinder. The at least one hydraulic damping element can furthermore be associated with a hydraulic valve, in particular a proportional directional control valve. The "spring constant" of the hydraulic damping element can then be regulated by the pressure set at the damping element. Furthermore, active damping regulation can be achieved in this manner. The hydraulic valves can be configured as described further above.

Alternatively or additionally, the damping element can comprise one or more mechanical spring elements. For example, the damping element can comprise rubber buffers. It is also possible for the hydraulic damping elements to comprise an additional mechanical spring element. This allows for additional passive damping to be achieved.

The agricultural apparatus can comprise sensors which allow for vibrations of the respective booms about a vertical axis to be detected. In this case, it is possible to react to the vibrations detected by activating the hydraulic pressure valve associated with the damping element and thereby actively dampen the vibrations. In particular, the pressure sensors can be configured to detect a pressure and/or a change in pressure in the at least one hydraulic damping element and/or in the third and fourth hydraulic actuating device. The force that is exerted upon the at least one hydraulic damping element and/or upon the third or fourth hydraulic actuating device by a motion of a boom about the respective vertical axis of rotation is manifested in a change in pressure in the interior of the hydraulic damping element or the respective hydraulic actuating device. Vibrations of a boom in and opposite to the direction of travel of the agricultural apparatus can then be detected by way of the pressure measurement at the hydraulic damping element. Vibrations arising in and opposite to the direction of travel can therefore be determined with such sensors by detecting changes in pressure.

Alternatively or additionally, the sensor device can comprise acceleration and/or motion sensors, where the acceleration and/or motion sensors are arranged on the respective booms. Motions of the booms can be directly detected by way of such sensors.

The agricultural apparatus can furthermore comprise sensors which allow for vibrations of the respective booms about a vertical axis to be detected. In this case, it is possible to react to the vibrations detected by activating the first and/or second hydraulic actuating device and to thus actively dampen the vibrations. The sensors can be, for example, acceleration sensors. The sensors can also be pressure sensors that detect the pressure in the first and second hydraulic actuating device. Vertical vibrations arising can be determined with such sensors by detecting changes in pressure.

The invention furthermore provides a method according to claim 13 for controlling an agricultural apparatus. The agricultural apparatus can comprise one or more of the features described above. The method comprises the following steps:

activating the first hydraulic actuating device for moving the respective first boom about the first axis of rotation pointing in the direction of travel of the agricultural apparatus.

activating the second hydraulic actuating device for moving the respective second boom about the second axis of rotation pointing in the direction of travel of the agricultural apparatus.

Figure 3:
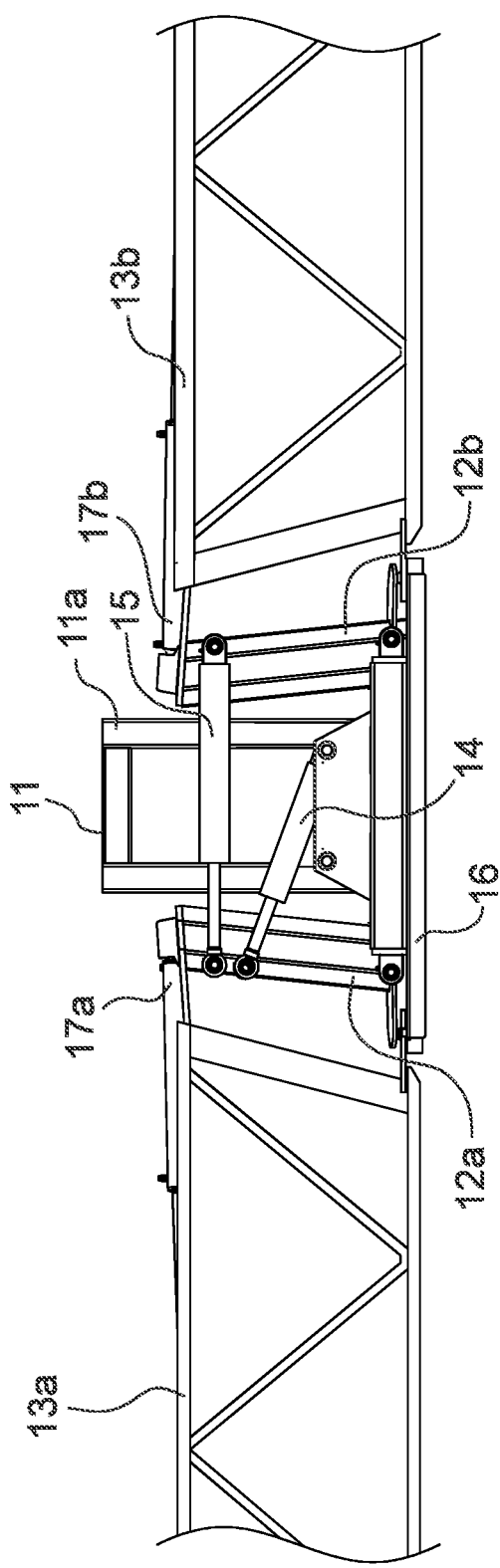
Figure 4B:
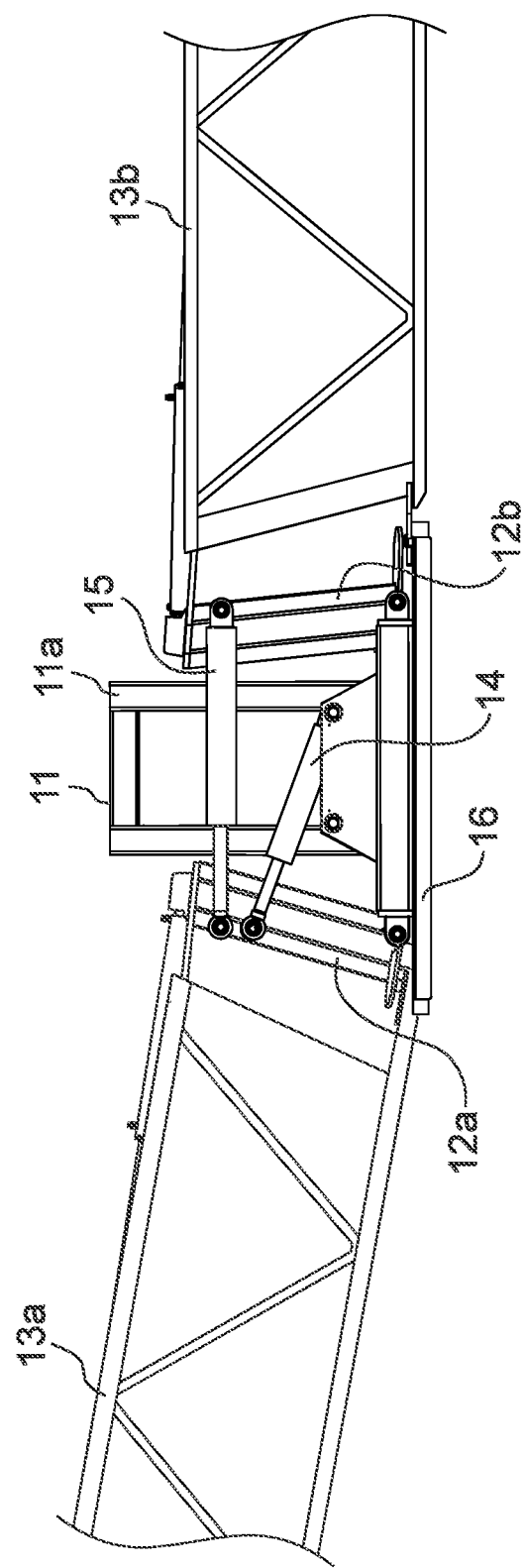
Figure 4C:
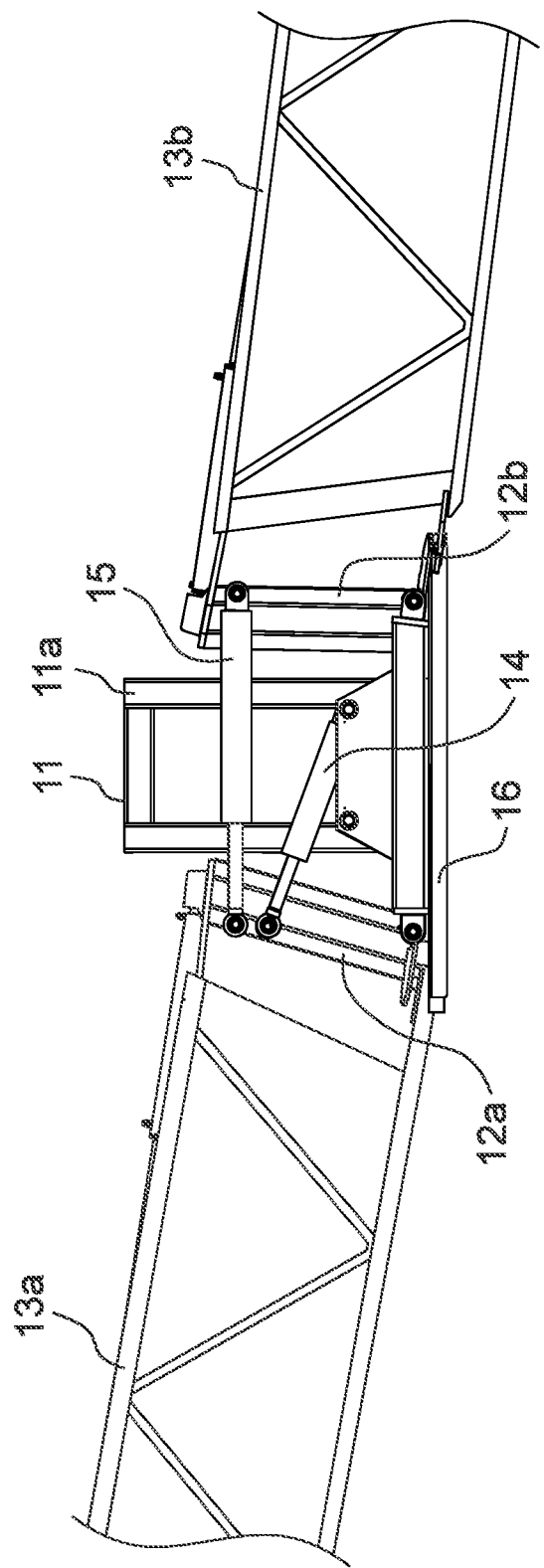
Figure 6A:
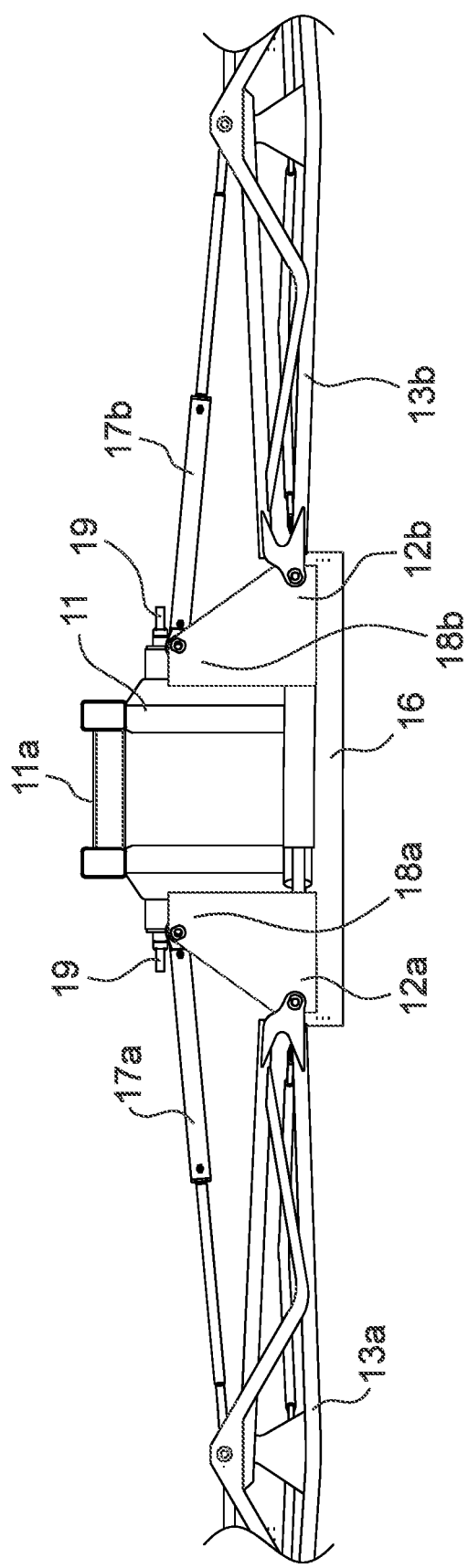
Figure 6B:
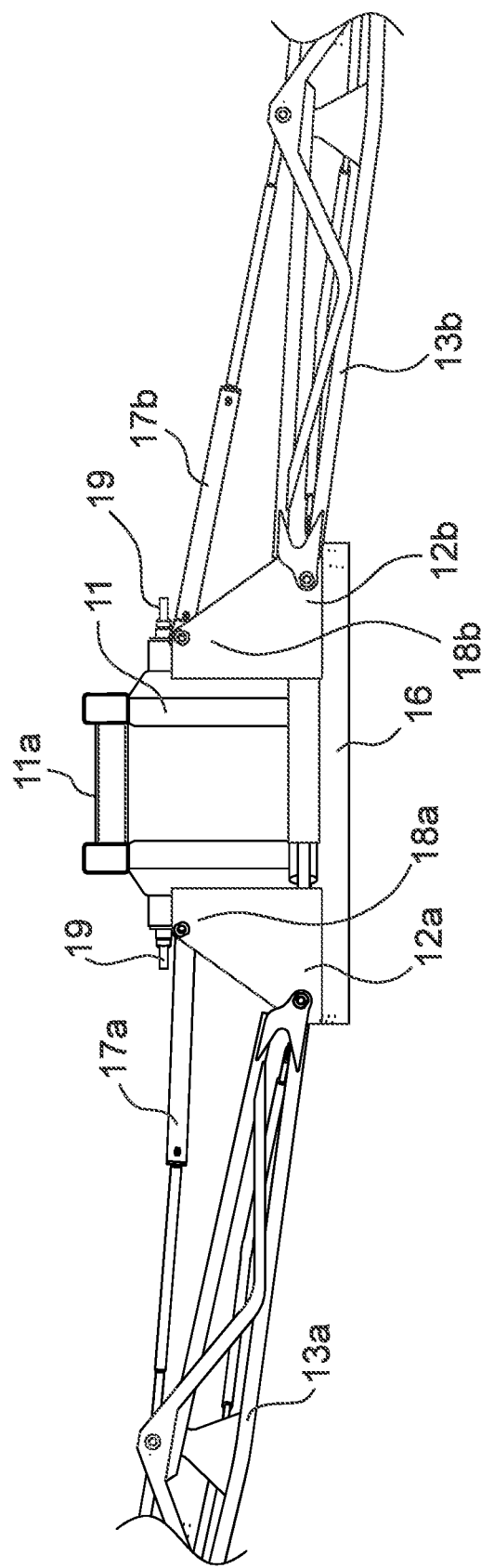

Further features and advantages of the invention shall be explained below with reference to the figures by way of example, where:

FIGS. 1a to 1c schematically show the rear view of an agricultural apparatus;

FIG. 2 schematically shows a perspective view of a detail of an agricultural apparatus;

FIG. 3 schematically show the rear view of a detail of an agricultural apparatus;

FIGS. 4a to 4c schematically show the rear view of a detail of an agricultural apparatus;

FIG. 5 schematically shows the rear view of a detail of an agricultural apparatus; and FIGS. 6a and 6b schematically show the top view of a detail of an agricultural apparatus; and FIGS. 7a and 7b schematically show the front view of a detail of an agricultural apparatus.

FIGS. 1a to 1c show an agricultural apparatus 1 which is configured as a field sprayer in a rear view. It can be seen that apparatus 1 comprises a distributor linkage 10 with a central part 11, Furthermore, distributor linkage 10 comprises two booms 13a and 13b which are connected to central part 11 by joints. It can also be seen that booms 13a and 13b each comprise several linkage sections which are connected to one another by foldable joints. The individual linkage sections can be folded about a vertical axis so that the working width of the agricultural apparatus can be adapted. The linkage sections can be folded independently for respective boom 13a and 13b.

FIG. 1a shows a state in which booms 13a and 13b are fully folded out. FIG. 1b shows a state in which only the innermost linkage section of booms 13a and 13b is folded out, while the remaining linkage sections are folded in. FIG. 1c shows a state in which all the linkage section of boom 13a are folded out, while only the innermost linkage section of boom 13b is folded out.

FIG. 2 schematically shows a detail of a first embodiment of agricultural apparatus 1. The arrow indicates the direction of travel of agricultural apparatus 1. It can be seen that central part 11 comprises a rectangular frame part 11a standing upright in its front region, i.e. disposed in the direction of travel. Frame part 11a can be used, for example, to connect central part 11 to agricultural apparatus 1 in a rotationally fixed manner. Frame part 11a can be connected to agricultural apparatus 1 in particular also in a height-adjustable manner.

Furthermore, central part 11 comprises a transverse frame 16 in its rear lower region. Two intermediate frames 12a and 12b are arranged on transverse frame 16 pointing upwardly. Intermediate frames 12a and 12b are connected to central part 11 in an articulated manner so that they can each be moved about horizontal axes of rotation h1 and h2 and vertical axes of rotation v1 and v2. The connection of intermediate frames 12a and 12b to transverse frame 16 can be effected, for example, by way of ball joints, presently not shown, which enable the rotational motions described. Intermediate frames 12a and 12b are therefore arranged on central part 11 such that their respective horizontal axes of rotation h1 and h2 run in the lower region of distributor linkage 10.

FIG. 2 furthermore shows that intermediate frame 12a is connected to central part 11 by way of a first hydraulic actuating device 14. Where one end of hydraulic actuating device 14 is connected to intermediate frame 12a in its upper region. The other end of actuating device 14 is connected to the central frame in its lower region, specifically on the side disposed closer to intermediate frame 12b. In other words, hydraulic actuating device 14 is arranged at an angle between intermediate frame 12a and central part 11. The respective connection points to intermediate frame 12a and central part 11 are spaced from horizontal axis of rotation h1 of intermediate frame 12a. This enables advantageous transmission of force from the hydraulic actuating device to intermediate frame 12a in order to achieve a rotational motion of intermediate frame 12a about its horizontal axis of rotation h1.

It can also be seen that intermediate frame 12a and intermediate frame 12b are connected to one another by way of a second hydraulic actuating device 15. Second hydraulic actuating device 15 is arranged to run horizontally in the upper region of intermediate frames 12a and 12b. A rotational motion of intermediate frame 12b about its horizontal axis of rotation h2 can be obtained by appropriate actuation of actuating devices 14 and 15. This is described in more detail below with reference to FIGS. 4a to 4c.

Actuating devices 14 and 15 are configured as hydraulic cylinders 14 and 15 in the embodiment shown.

FIG. 2 furthermore shows that intermediate frames 12a and 12b are each connected at their upper and lower ends to booms 13a and 13b in an articulated manner. Booms 13a and 13b can each move about a vertical axis of rotation v1, v2 with respect to intermediate frames 12a and 12b. With regard to horizontal rotations, booms 13a and 13b are attached in a rotationally fixed manner to intermediate frames 12a and 12b. A rotational motion of intermediate frames 12a and 12b about their horizontal axes of rotation h1 and h2 is thus transmitted to booms 13a and 13b, respectively. In other words, booms 13a and 13b can be moved by way of hydraulic actuating devices 14 and 15 about horizontal axes of rotation h1 and h2 of intermediate frames 12a and 12b. The inclination of booms 13a and 13b can thus be controlled by way of actuating devices 14 and 15. On the one hand, this can be used to adapt the inclination of booms 13a and 13b to the ground. On the other hand, damping of the vibration motions of booms 13a and 13b in the vertical direction can also be achieved by way of suitable control of actuating devices 14 and 15. It is also possible to largely decouple the motions of booms 13a and 13b from the motions of agricultural apparatus 1 by suitably actuating hydraulic actuating devices 14 and 15.

It can also be seen in FIG. 2 that two hydraulic actuating devices 17a and 17b each connect booms 13a,b to intermediate frames 12a,b. The articulated arrangement of booms 13a,b on respective intermediate frames 12a,b makes it possible by way of actuating devices 17a,b to move booms 13a and 13b about respective vertical axes of rotation v1 and v2. In particular, actuating devices 17a, b can be used to transfer distributor linkage 10 from a working to a transport position, or vice versa. It is also possible for actuating devices 17a,b to be controlled in order to dampen vibrations of booms 13a,b in or opposite to the direction of travel of agricultural apparatus 1.

It can also be seen that intermediate frames 12a,b each comprise a curved articulation plate 18a,b at their respective upper ends. An outer end of articulation plates 18a,b is connected to actuating device 17a,b, while the other outer end of articulation plates 18a,b is connected to boom 13a,b. With such a configuration of intermediate frames 12a,b, advantageous transmission of force between intermediate frames 12a,b and booms 13a,b can be achieved.

FIG. 3 schematically shows a detail of the first embodiment of agricultural apparatus 1 shown in FIG. 2 in a rear view. FIG. 3 shows a state of distributor linkage 10 in which both booms 13 a,b have an angle of 90° relative to the vertical. On level ground, for example, this state can correspond to a normal working position of distributor linkage 10 in which both booms 13a,b are led parallel to the ground.

In contrast, FIGS. 4a to 4c show in a rear view various states of inclination of distributor linkage 10 corresponding to the embodiment shown in FIG. 2.

FIG. 4a shows an inclination state of distributor linkage 10 in which boom 13b is angled up, while boom 13a has an angle of 90° relative to the vertical. It can be seen that actuating device 15, which connects intermediate frames 12a and 12b, is shortened compared to the state shown in FIG. 3, i.e. the piston of hydraulic cylinder 15 has been retracted. In contrast, the length of actuating device 14 is unchanged compared to the state shown in FIG. 3, For example, the piston of hydraulic cylinder 14 can have been locked in position by closing a check valve. It is also possible that a pressure acting upon hydraulic cylinder 14 has been dynamically adapted in order to prevent a motion of intermediate frame 12a. In any case, boom 12a is affixed with respect to central part 11, it therefore does not move about its horizontal axis of rotation. Intermediate frame 12a then acts as a rigid element and a force due to the shortening of actuating device 15 acts upon intermediate frame 12b and causes a torque about the latter's horizontal axis of rotation. This in turn leads to boom 13b angling up, In a similar manner, extending the piston of hydraulic cylinder 15 (not shown) while maintaining the piston position of hydraulic cylinder 14 results in boom 13b angling down.

FIG. 4b shows an inclination state of distributor linkage 10 in which boom 13a is angled up. while boom 13 has an angle of 90° relative to the vertical. It can be seen that actuating device 14, which connects intermediate frame 12a to central part 11, is shortened compared to the state shown in FIG. 3, i.e. the piston of hydraulic cylinder 14 has been retracted. As a result, a force acts upon intermediate frame 12a which results in a torque about the latter's horizontal axis of rotation. This in turn leads to boom 13a angling up. It can also be seen that actuating device 15 has also been shortened compared to the state shown in FIG. 3, i.e. the piston of hydraulic cylinder 15 has been retracted. By retracting the piston of hydraulic cylinder 15, the motion of intermediate frame 12a is not transmitted to intermediate frame 12b. In an analogous manner, an extension (not shown) of the piston of both hydraulic cylinders 14 and 15 results in boom 13a angling down.

FIG. 4c shows an inclination state of distributor linkage 10 in which boom 13a is angled up, while boom 13b is angled down. In other words, distributor linkage 10 is tilted clockwise when viewed in the direction of travel. It can be seen that actuating device 14 is shortened compared to the state shown in FIG. 3, i.e. the piston of hydraulic cylinder 14 has been retracted. As described above with reference to FIG. 4b, this leads to boom 13a angling up. Furthermore, it can be seen that the length of actuating device 15 is unchanged compared to the state shown in FIG. 3. For example, the piston of hydraulic cylinder 15 can have been locked in position by closing a check valve, It is also possible that a pressure acting upon hydraulic cylinder 15 has been dynamically adapted in order to keep the position of the piston constant. In any case, actuating device 15 therefore acts as a rigid element. The rotational motion of intermediate frame 12a about its horizontal axis of rotation results in a force upon intermediate frame 12b which leads to a corresponding rotational motion of intermediate frame 12b about its horizontal axis of rotation. This results in boom 13b angling down.

In view of what has just been stated, it goes without saying that it is possible to create any inclination states of booms 13a and 13b by adjusting hydraulic actuating devices 14 and 15, in particular the piston position of hydraulic cylinders 14 and 15 accordingly. For example, it is possible for the piston of hydraulic cylinder 14 to be retracted for angling boom 13a up. If, at the same time, the piston of hydraulic cylinder 15 is retracted to a greater extent than shown in FIG. 4b, boom 13b is also angled up.

It can also be seen in FIGS. 4a to 4c that the length of actuating devices 17a,b does not have to be changed, regardless of the state of inclination of boom 13a,b, because the inclination of boom 13a and 13b is controlled directly by way of the inclination of intermediate frames 12a and 12b, where actuating devices 17a and 17b connect intermediate frames 12a and 12b to booms 13a and 13b. This eliminates the need to have to carry along actuating devices 17a and 17b when controlling the inclination of booms 13a and 13b.

FIG. 5 schematically shows a detail of the second embodiment of agricultural apparatus 1 in a rear view. The second embodiment shown differs from the embodiment shown in FIGS. 2 to 4 in that second actuating device 15 connects central part 11 to second intermediate frame 12b. In the embodiment shown, the arrangement of second actuating device 15 is symmetrical to the arrangement of first actuating device 14. Intermediate frames 12a and 12b are then decoupled with respect to rotational motions about their horizontal axes of rotation. Booms 13a and 13b are therefore angled up or down, respectively, directly by retracting or extending the pistons of hydraulic cylinders 14 or 15, respectively.

FIGS. 6a and 6b schematically show a detail of agricultural apparatus 1 in a top view. In addition to the elements of the distributor linkage described further above, a damping assembly 19 can be seen which is arranged between intermediate frames 12a and 12b which are in the direction of travel disposed at the front. Damping assembly 19 can comprise one or more damping elements 20. Damping elements 20 can comprise, for example, one or more in particular hydraulic extension cylinders and/or rubber elements, as shown in more detail in FIGS. 7a and 7b.

FIG. 6a shows a state in which both booms 13a and 13b have an angle of 90° relative to the direction of travel of agricultural apparatus 1. In contrast, FIG. 6b shows a state in which boom 13a is deflected in the direction of travel while boom 13b is deflected in a direction opposite to the direction of travel. The state shown in FIG. 6b can occur, for example, due to vibrations of the distributor linkage in the direction of travel caused by yawing motions of agricultural apparatus 1. It can be seen how the vibration motion of booms 13a and 13b is converted into rotational motions of intermediate frames 12a and 12b by actuating devices 17a and 17b and curved articulation plates 18a,b. It can furthermore be seen that damping assembly 19 in FIG. 6b has been displaced horizontally compared to the state shown in FIG. 6a. In the case shown, intermediate frames 12a and 12b are coupled in the horizontal direction by way of damping assembly 19. A motion in the horizontal direction is dampened and transmitted from one boom to the other. The transmission of forces resulting from such vibrations to rigid central part 11 and agricultural apparatus 1 can thus be reduced.

FIGS. 7a and 7b schematically show a detail of agricultural apparatus 1 in a front view, i.e. viewed in a direction opposite to the direction of travel of the agricultural apparatus.

FIG. 7a shows a first embodiment of damping assembly 19 which comprises a hydraulic cylinder 20 as a damping element. When one of booms 13a,b moves in or opposite to the direction of travel of the agricultural apparatus, the piston of cylinder 19 can move horizontally and thereby transmit the motion to the other boom. At the same time, cylinder 20 passively dampens this motion due to the hydraulic fluid. It is also possible that a pressure applied to the chambers of cylinder 20 is actively controlled in order to achieve active damping. In particular, it is possible for a vibration motion of booms 13a,b to be determined by way of sensors (not shown). These sensors can be, for example, acceleration sensors which are arranged on booms 13a,b. However, it is also possible to measure changes in pressure in the chambers of cylinder 20 and/or actuating devices 17a and 17b for determining such vibrations. It is then possible to regulate the pressure in the chambers of cylinder 20 such that the vibration motion is damped.

It is also possible for hydraulic cylinder 20 to comprise several hydraulic chambers, where it is possible to control the hydraulic pressure individually in the respective chambers. It is also possible for additional mechanical spring elements to be arranged in the hydraulic chambers. This allows for an additional passive damping effect to be obtained.

FIG. 7b shows an alternative embodiment of damping assembly 19. Damping assembly 19 is there configured in the form of two rubber buffer elements between the central part and intermediate frames 12a and 12b. This represents a simple and inexpensive variant of a damping assembly 19.

Alternatively it is possible that damping assembly 19 comprises two hydraulic cylinders which are arranged between the central part and intermediate frames 12a and 12b. This can achieve active damping of vibration motions, as described further above.

It goes without saying that the features mentioned in the embodiments described above are not restricted to these special combinations and are also possible in any other combinations. Furthermore, it goes without saying that the geometries shown in the figures are only by way of example and are also possible in any other configuration.

The invention claimed is:

1. An agricultural apparatus for spreading material, comprising:
 a distributor linkage which can be folded on both sides, comprising:
  a central part, where said central part is connected in a rotationally fixed manner to said agricultural apparatus;
  two intermediate frames connected to said central part by joints;
  two lateral booms connected to said respective intermediate frames;
 a first hydraulic actuating device which connects a first of said intermediate frames to said central part, where said respective first boom can be moved by said first hydraulic actuating device about a first axis of rotation pointing in a direction of travel of said agricultural apparatus; and
 a second hydraulic actuating device, where said respective second boom can be moved by said second hydraulic actuating device about a second axis of rotation pointing in the direction of travel of said agricultural apparatus,
 wherein said second hydraulic actuating device connects said intermediate frames to one another.

2. The agricultural apparatus according to claim 1,
 where said central part comprises a transverse frame,
 where said first intermediate frame and said second intermediate frame are arranged pointing upwardly on said transverse frame,
 where said first axis of rotation pointing in the direction of travel of said agricultural apparatus is arranged in a lower region of said first intermediate frame, and
 where said second axis of rotation pointing in the direction of travel of said agricultural apparatus is arranged in the lower region of said second intermediate frame.

3. The agricultural apparatus according to claim 1, where said first hydraulic actuating device:
 is connected to said first intermediate frame in an upper region of said first intermediate frame, and
 is connected to said central part in the lower region of said central frame, in particular to said transverse frame, and spaced from said first intermediate frame.

4. The agricultural apparatus according to claim 3, where said second hydraulic actuating device connects said intermediate frames to one another in the upper region of said intermediate frames.

5. The agricultural apparatus according to claim 1, where said intermediate frames are each connected to said central part by a ball joint.

6. The agricultural apparatus according to claim 1, further comprising:
 a third hydraulic actuating device, where said third hydraulic actuating device connects a first of said intermediate frames to said corresponding first boom,
 where said first boom can be moved by way of said third hydraulic actuating device about a first vertical axis of rotation; and
 a fourth hydraulic actuating device, where said fourth hydraulic actuating device connects said respective second intermediate frame to said corresponding second boom,
 where said second boom can be moved by way of said fourth hydraulic actuating device about a second vertical axis of rotation.

7. The agricultural apparatus according to claim 1, further comprising a damping assembly for damping motions of said first boom and said second boom in the direction of travel of said agricultural apparatus.

8. The agricultural apparatus according to claim 7, where said damping assembly connects said intermediate frames to one another independently of said central part.

9. The agricultural apparatus according to claim 7, where said damping assembly comprises at least one mechanical and/or hydraulic damping element, in particular a hydraulic cylinder.

10. The agricultural apparatus according to claim 9, where said damping assembly comprises at least two damping elements, where one respective damping element each connects an intermediate frame to said central part.

11. The agricultural apparatus according to claim 7, where said damping assembly further comprises a mechanical spring element.

12. The agricultural apparatus according to claim 1, further comprising sensors which allow for vibrations of said respective booms about a vertical axis and/or a horizontal axis to be detected.

13. A method for controlling an agricultural apparatus, the method comprising:
- activating a first hydraulic actuating device for moving a first lateral boom about a first axis of rotation pointing in a direction of travel of said agricultural apparatus; and
- activating a second hydraulic actuating device for moving a second lateral boom about a second axis of rotation pointing in the direction of travel of said agricultural apparatus, wherein the agricultural apparatus includes:

a distributor linkage which can be folded on both sides, comprising:
- a central part, where said central part is connected in a rotationally fixed manner to said agricultural apparatus;
- two intermediate frames connected to said central part by joints;
- said two lateral booms connected to said respective intermediate frames;
- said first hydraulic actuating device which connects a first of said intermediate frames to said central part, where said respective first lateral boom can be moved by said first hydraulic actuating device about the first axis of rotation pointing in the direction of travel of said agricultural apparatus; and
- said second hydraulic actuating device, where said respective second lateral boom can be moved by said second hydraulic actuating device about the second axis of rotation pointing in the direction of travel of said agricultural apparatus, wherein said second hydraulic actuating device connects said intermediate frames to one another.

* * * * *